United States Patent
Lomberk

(10) Patent No.: US 7,513,470 B2
(45) Date of Patent: Apr. 7, 2009

(54) TRIPOD TRAY FOR PCS, ELECTRONIC EQUIPMENT AND ACCESSORIES

(76) Inventor: Jason E. Lomberk, 324 Ocean Blvd., Atlantic Highlands, NJ (US) 07716

( * ) Notice: Subject to any disclaimer, the term of this patent is extended or adjusted under 35 U.S.C. 154(b) by 336 days.

(21) Appl. No.: 11/480,121

(22) Filed: Jul. 3, 2006

(65) Prior Publication Data
US 2008/0001045 A1    Jan. 3, 2008

(51) Int. Cl.
*F16M 11/02* (2006.01)
(52) U.S. Cl. .............. 248/177.1; 248/187.1; 248/163.1; 248/163.2; 248/432; 248/440; 248/176.1; 108/152; 108/157.13; 108/106; 108/147.17
(58) Field of Classification Search .............. 248/177.1, 248/188.2, 188.9, 163.1, 163.2, 432, 440, 248/441.1, 176.1, 309.1; 108/152, 157.13, 108/106, 147.17; 396/419, 428, 420; 362/198, 362/382; 403/170
See application file for complete search history.

(56) References Cited

U.S. PATENT DOCUMENTS

| | | | | |
|---|---|---|---|---|
| 2,984,443 | A * | 5/1961 | Bergengren | 248/124.2 |
| 5,404,280 | A * | 4/1995 | Greek et al. | 362/198 |
| 6,240,857 | B1 * | 6/2001 | Elizer | 108/152 |
| 6,467,738 | B1 * | 10/2002 | Hedrick et al. | 248/164 |
| 6,604,720 | B1 * | 8/2003 | Wilson | 248/177.1 |
| 6,651,944 | B2 * | 11/2003 | Coleman | 248/163.1 |
| 7,207,533 | B1 * | 4/2007 | Coleman et al. | 248/188.2 |
| 2008/0053344 | A1 * | 3/2008 | Almond | 108/152 |

* cited by examiner

*Primary Examiner*—J. Allen Shriver
*Assistant Examiner*—Todd M. Epps
(74) *Attorney, Agent, or Firm*—Charles I. Brodsky

(57) ABSTRACT

A personal computer, video monitor or other electronic equipment mounted directly on a camera tripod by a tray offering a cantilever technique of support by having a rear end supported by two clamps individually positioned at the same height on two of the tripod legs, and a front end locked by a third clamp at a higher elevation on the remaining leg of the tripod.

9 Claims, 7 Drawing Sheets

TRIPOD TRAY FOR PCS, ELECTRONIC EQUIPMENT AND ACCESSORIES

CROSS-REFERENCE TO RELATED APPLICATIONS

NONE.

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to the coaching of participants in sports motion, in general, and to the instructions for their ultimate athletic performance, in particular.

2. Description of Related Art

Film and video cameras are being used more frequently for the development of improved athletic activities. Whether they be used in the analysis of a golfer's swing, a pitcher's pick-off move, a running back's cradling of the ball, a hoopster's free-throw release, or a sprinter's finish line lunge, their availability has become a major tool in a coach's teaching arsenal.

As will become clear from the following description, the present invention expands upon this by providing for the coupling of the camera to a personal computer in a portable system. The coach or instructor can then see on the monitor a view through the camera lens of the participating athlete in motion in using the computer to capture the image and to store it on a disc. From that point, the coach or instructor can play back the image and its video file over-and-over again, starting and stopping it where desired, and zoom in or out to study the different aspects of the body positionings both to look for existing problems, and to change things in a suitable manner. In its simplest terms, the portable system of the invention consists of a training type tool to be used with an athlete in developing his/her performance to the utmost.

SUMMARY OF THE INVENTION

The tripod tray of the invention is of a unique design, developed to allow the mounting of such electronic equipment as a personal computer or a video monitor directly on a camera tripod, while allowing for the simultaneous mounting of a camera or camcorder itself. A cantilever technique utilizing three simple clamps attached to the legs of the tripod is employed to provide a configuration absent of any moving parts. As will be appreciated by those skilled in the art, the assembly will take only seconds to set up—and requires no extra brackets, fasteners or other parts for support. Primarily intended for use with a professional grade tripod, the tray will be able to easily support a laptop, a monitor or other similar electronic equipment simultaneously with the attaching of a standard camera or camcorder. The tray design will be seen to be such that its positioning on the tripod is at a comfortable working height adjustable to the user, and which does not interfere with the operation either of the mounted camera or camcorder.

As will be more particularly described, the complete assembly consists of the tray and three support clamps. In a preferred embodiment, the tray comprises a rigid, flat, one-piece rectangular sheet constructed from aluminum or Lucite, having a triangular cutout at one end for mounting over the legs of the camera tripod. Made from tempered aluminum plate or plastic/Lucite for example (and approximately 21" by 13" wide, and ⅛-¼" thick), the mounting tray includes the cutout in a pattern matching the tripod leg configuration. The support clamps for the tray, at the same time, are round, screw-type adjustable clamps composed of plastic or metal, two of which tighten around tripod legs to form a support for the tray, and with the third tightening around a leg to provide the cantilever action. As will become clear, the tray slips over the tripod and is entirely self-supported by the first two clamps as rear supports on which the tray rests, with the weight of the computer, the monitor, or other electronic equipment on the tray acting to lock the tray in place under the third clamp at an elevated positioning on the tripod without any additional fasteners.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE INVENTION

Figure 1:
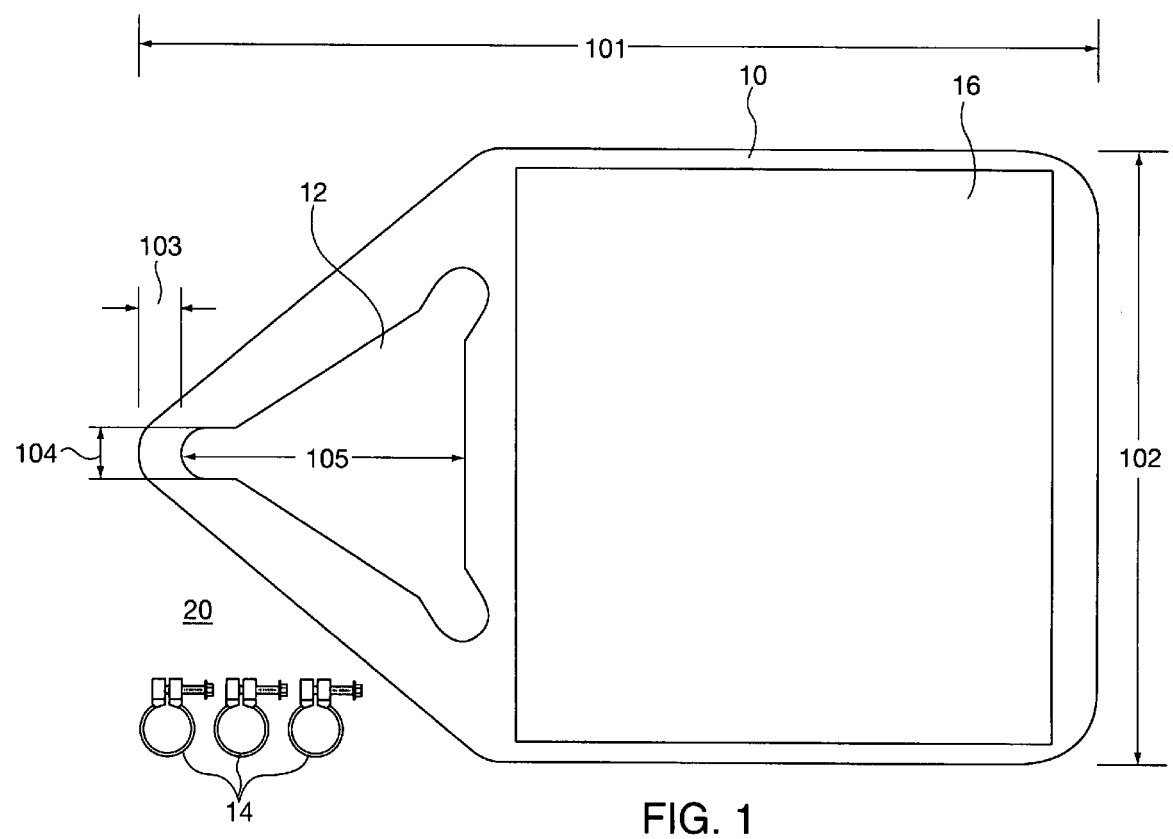
FIG. 1 is a top pictorial view of the tray and the three support clamps of the invention.

In the top view of FIG. 1, the aluminum or Lucite tray of the invention is shown at 10 having a triangular cutout at one end 12 for mounting at its apices over the legs of a camera tripod. In one construction of the invention, the following dimension were found quite useful for a tray thickness of ⅛-¼ inches:

| | |
|---|---|
| Length 101 | 21 inches |
| Width 102 | 13 inches |
| Spacing 103 | ¾ inches |
| Width 104 | 1⅛ inches |
| Length 105 | 6½ inches, | and with the apice dimensions being selected in accordance with the dimensions of the tripod legs (which for a professional grade tripod is typically of the order of 1 inch).

The three clamps 20 are screw-type adjustable clamps 14 of a plastic or metal composition openable and closable to tighten around the tripod legs. They may each be of a 1 inch nominal diameter—and a cushion matte 16 sits atop the tray 10 at its end opposite the cutout 12. Such matte may be of closed-cell foam fabrication.

Figure 2:
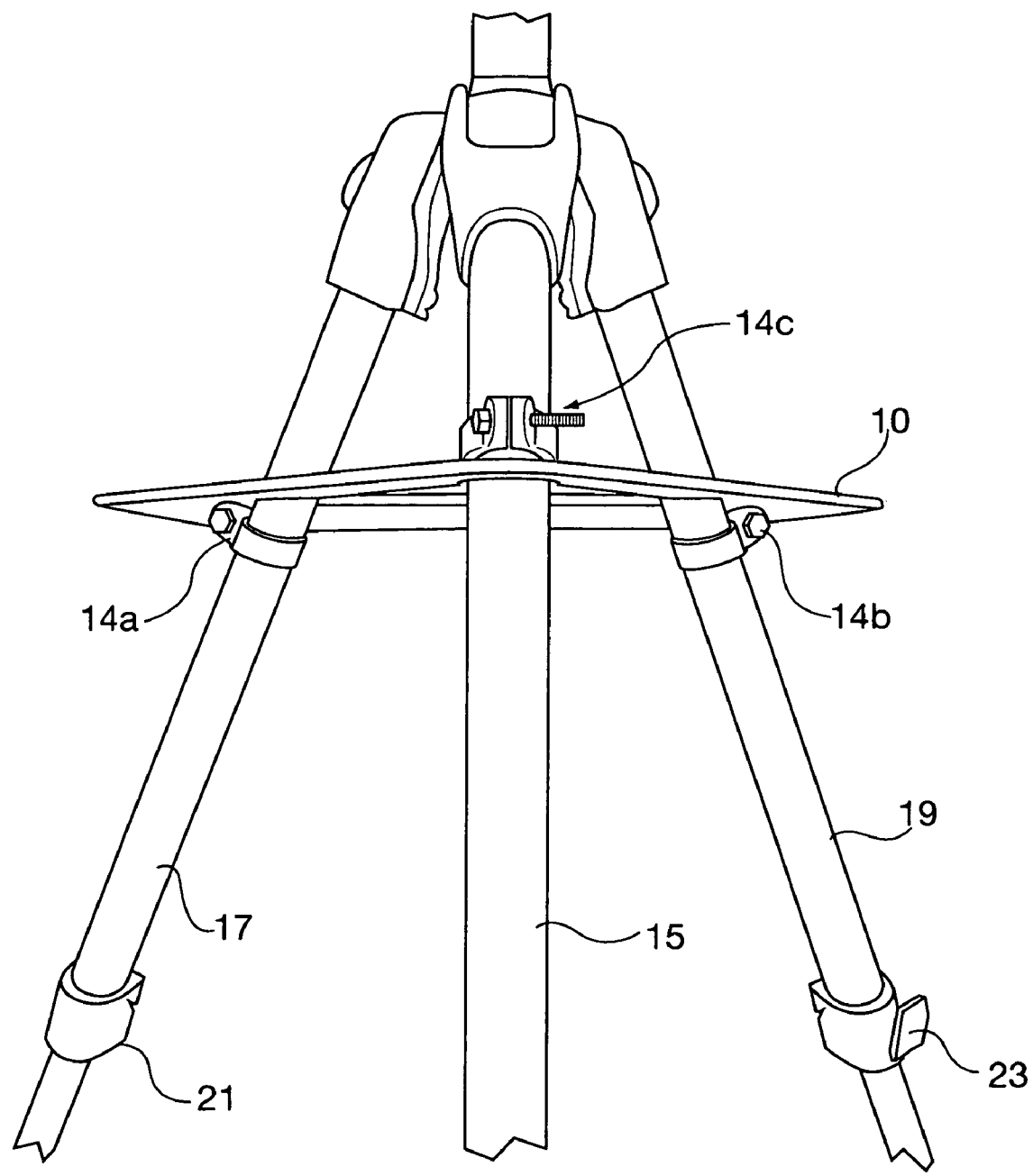
FIG. 2 is a front view of a camera tripod with the tray and clamps of FIG. 1 in place.
Figure 3:
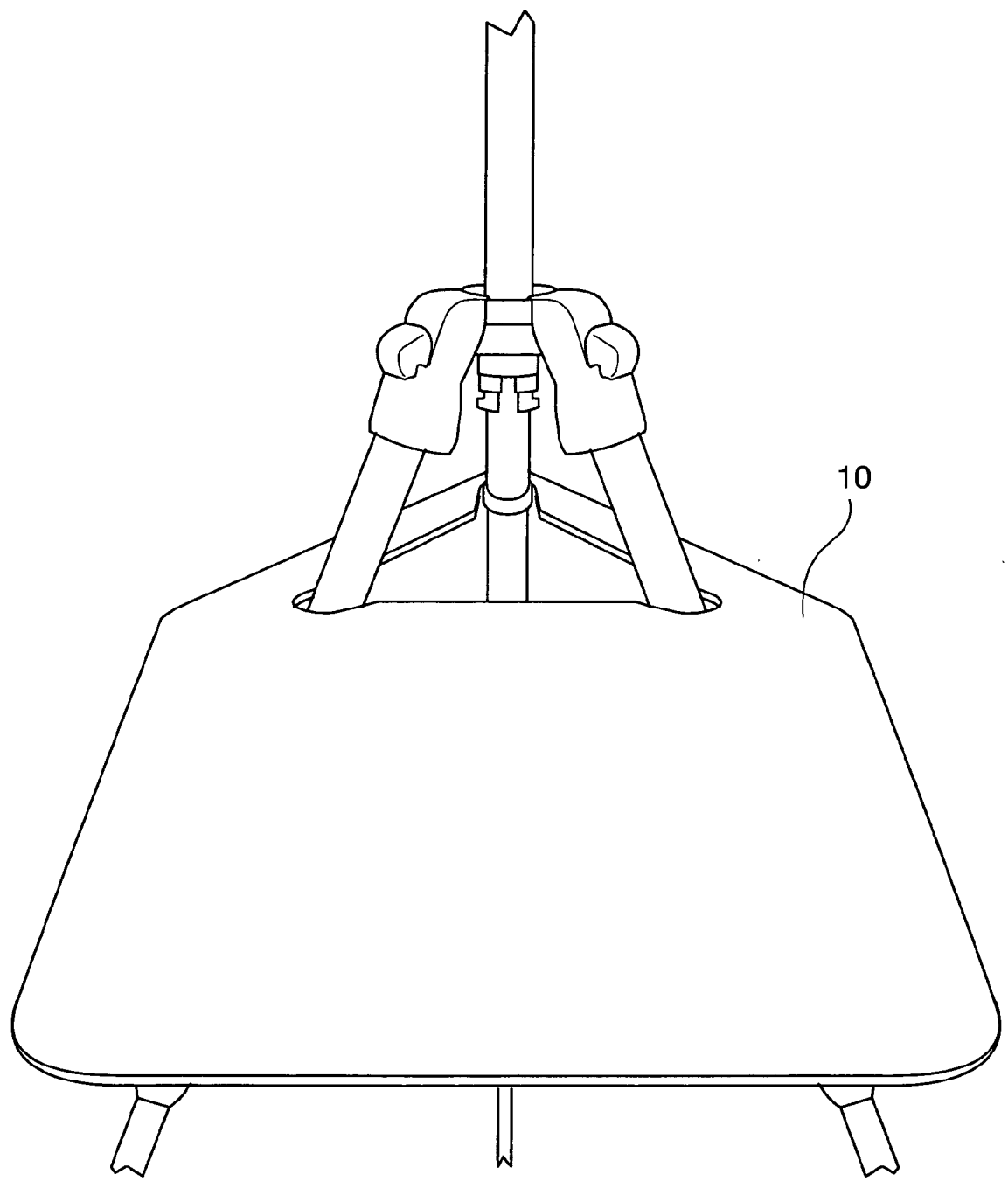
FIG. 3 is a rear top view of the tripod and tray ready to receive the computer, monitor or other equipment for use in coaching and instructing an athlete's performance.
Figure 4:
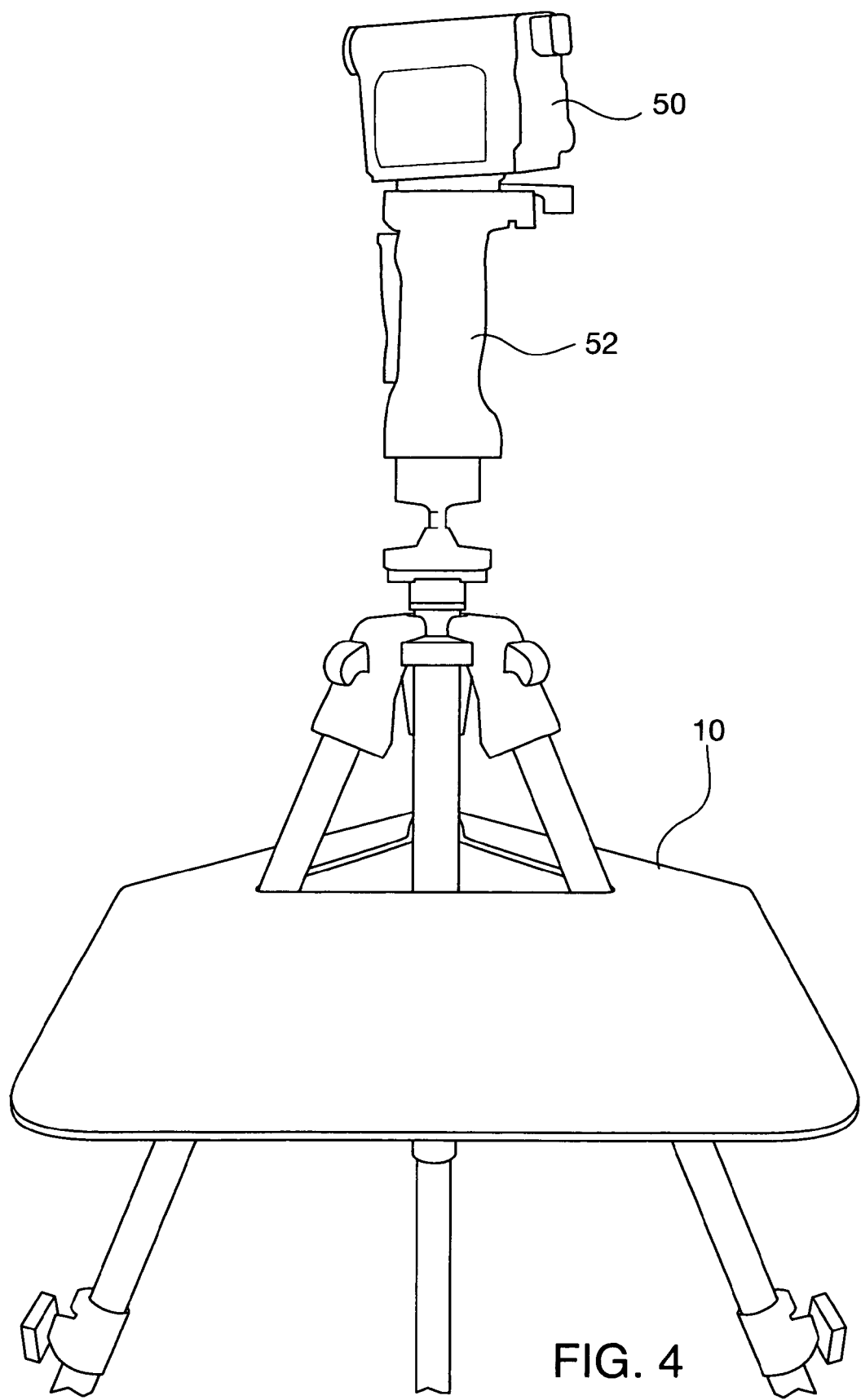
FIG. 4 is a similar rear top view of the tripod with a camera or camcorder mounted for viewing.
Figure 5:
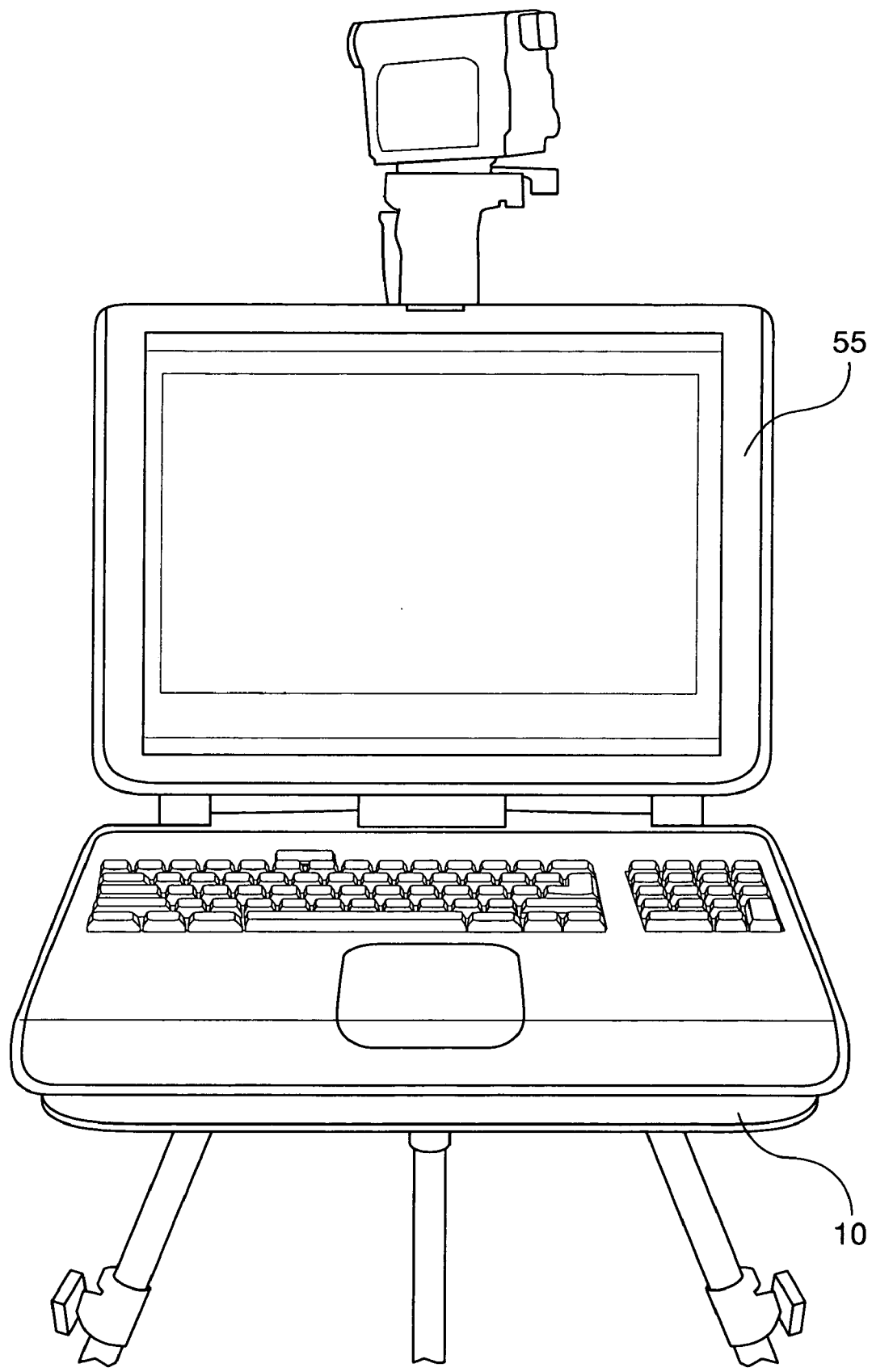
FIG. 5 is a further rear top view of the tripod along with a laptop supported on the tripod tray.

FIG. 2 shows the tray 10 mounted on the legs 15, 17 and 19 of a tripod. Clamps 21 and 23 represent two of the three clamps for adjusting the height of the tripod by adjusting the length of its legs. Two screw-type adjustable clamps of the invention 14a and 14b are mounted on the tripod legs 17 and 19 at the same, fixed lower height position than the third, screw-type adjustable clamp 14c mounted on the third tripod leg 15. In such manner, the tray 10 is entirely self-supported, locked under the front tray support clamp 14c and resting on the rear support clamps 14a, 14b in a cantilever configuration. (See the rear top view of FIG. 3, and the rear top view of FIG. 4 with a camcorder 50 coupled with the tripod by its mount 52.) With a laptop 55 placed on the tray cushion as in FIG. 5, the computer's weight on the tray further acts to lock the tray in place without any additional fasteners, simply by the cantilever effect produced by the positionings of the clamps 14a, 14b and 14c. Adjustment of the clamp 14c up and down the leg 15 for a fixed positioning of the clamps 14a and 14b serves to optimize the cantilever results for the weight to be placed on the tray 10.

As will be appreciated by those skilled in the art, the tray 10 of the invention may be of different sizes to accommodate different dimensions of computers, monitors or other electronic equipment. Similarly, the tray may be drilled with other varying size cutouts, to hold such photographic equipment as the lenses to be used, for example. Also, the tray may be hinged in the center if desired, to fold into a more compact size for storage when not being used. Where the computer, monitor or other electronic equipment is of a greater mass, additional thumb-screw adjustable clamps could be positioned above the tray 10 in FIGS. 3 and 4, slid down the legs 17 and 19, and tightened to further lock the tray in place.

Figure 6:
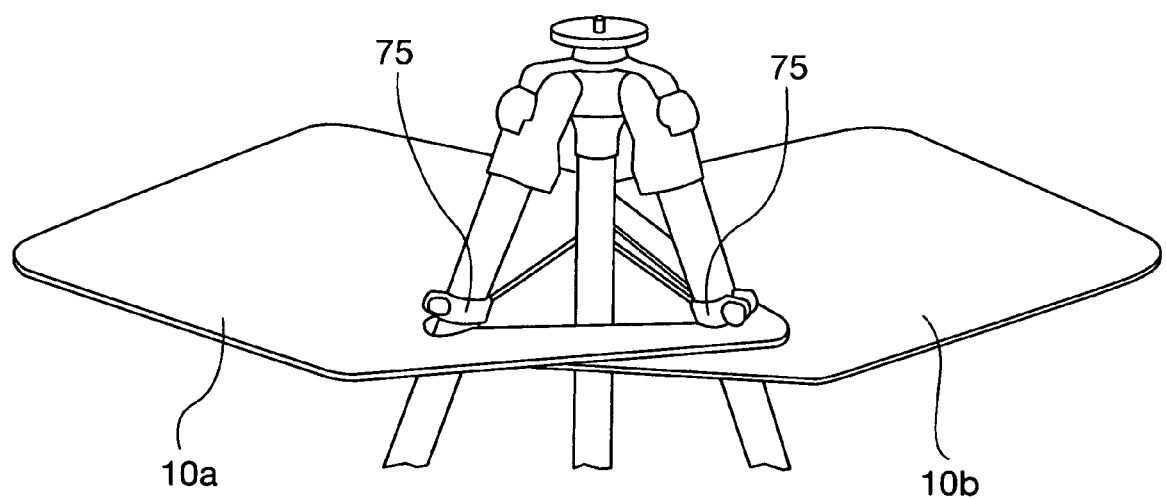
FIG. 6 is a left side view of the tripod configuration employing a pair of tripod trays helpful in an understanding of a further use of the invention.
Figure 7:
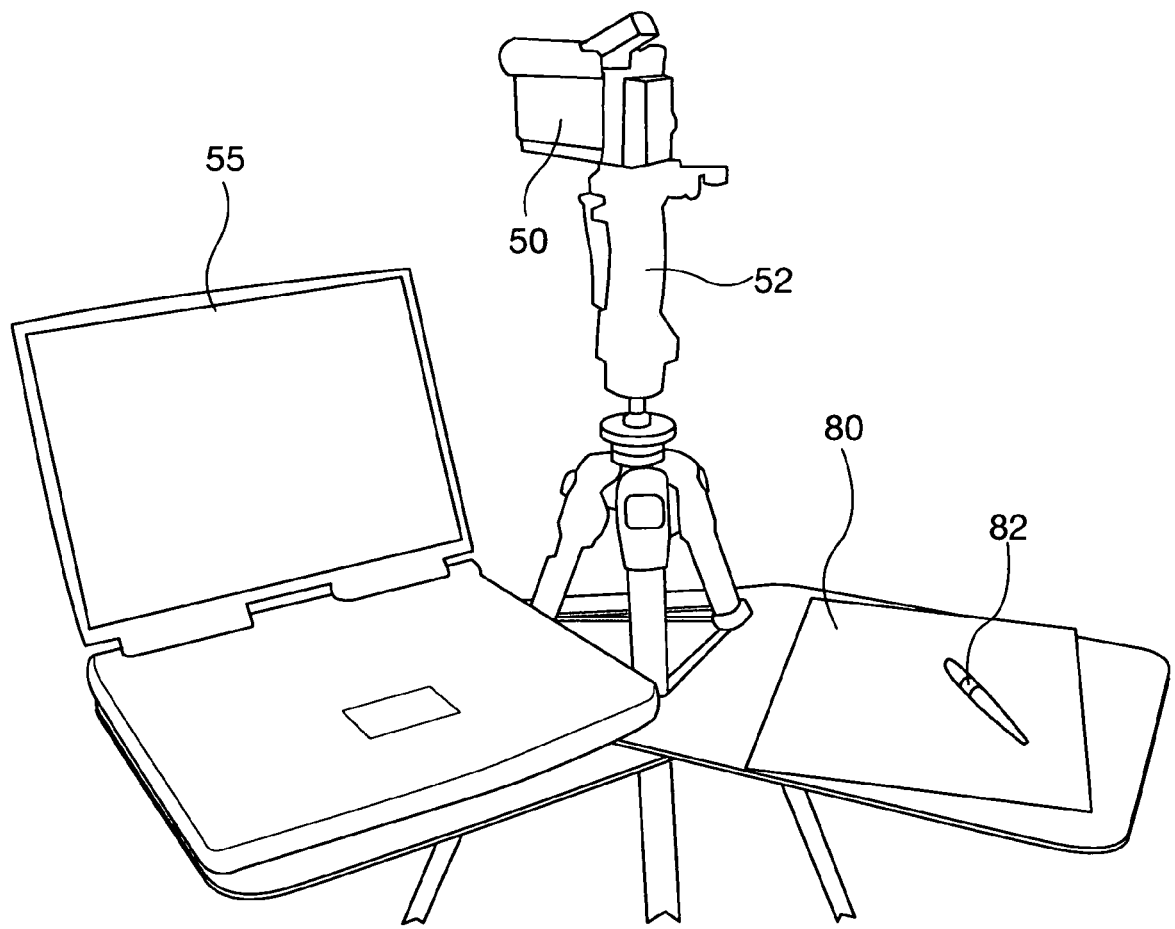
FIG. 7 is a rear view of the tripod illustrating a manner of using the two trays of FIG. 6 in tandem.

In the configuration of FIGS. 6 and 7, on the other hand, such additional clamps are particularly useful in locking pairs of trays together to provide two working surfaces on a single tripod. The additional two clamps are shown at 75, with the trays indicated at 10a and 10b. The camera mount is shown at 52, the camcorder at 50 and the laptop at 55—and with the additional tray 10b used to support a notepad 80 and pen 82 for information recording.

In operation, with the tripod, clamps, tray(s), camera and computer set up, everything seen by the camera can be viewed on the computer monitor and stored, for later use as a training tool to optimize the performance of an athlete. The tray or trays continue to rest on the two lower clamps 14a, 14b, with the third higher clamp 14c continuing to secure the tray in place through the cantilevered action. The weight of the equipment on the tray pulls the front end of the tray upwardly where it is locked by the raised clamp 14c.

While there have been described what are considered to be preferred embodiments of the present invention, it will be readily appreciated by those skilled in the art that modifications can be made without departing from the scope of the teachings herein. Thus, whereas the tripod tray has been described specifically for use in analyzing and coaching athletic performance motions, the teachings can also be used in the medical field by chiropractors, physical therapists and hospitals, for example, for use in conjunction with a rehabilitation movement program. In essence, then, the tripod tray of the invention will be seen to represent a generic, general purpose type tool that can be used in studying anything having to do with motion activity. For at least such reason, therefore, resort should be had to the claims appended hereto for a true understanding of the scope of the invention.

I claim:

1. Body motion analyzing apparatus comprising:
    a tripod having a head mount;
    a first clamp on a first tripod leg at a predetermined distance below said head mount;
    a second clamp on a second tripod leg at substantially the same predetermined distance below said head mount;
    a third clamp on a third tripod leg at a lesser predetermined distance below said head mount;
    a first tray having a triangular cutout with first and second apices fitted to respectively surround each of said first and second tripod legs and with a third apice fitted to surround said third tripod leg;
    one of a video camera, camcorder and digital camera secured to said tripod head mount;
    one of a personal computer, laptop and video monitor resting atop said tray;
    and wherein said tray is mounted to rest upon said first and second clamps as rear supports to extend forward below said third clamp;
    whereby any tendency for the weight of the computer, laptop or video monitor to upwardly lift a front end of the tray is resisted by the locking of said third clamp in position.

2. The apparatus of claim 1 wherein each of said first and second clamps are fixed in position.

3. The apparatus of claim 1 wherein said third clamp is adjustably positionable along said third leg.

4. The apparatus of claim 2 wherein said third clamp is adjustably positionable along said third leg.

5. The apparatus of claim 1 wherein each of said first, second and third clamps are adjustably openable and closeable.

6. The apparatus of claim 1 wherein said tray is one of an aluminum and Lucite composition.

7. The apparatus of claim 1, also including a second tray having a triangular cutout with three apices respectively surrounding each of said tripod legs overlapping said first tray, and a pair of adjustable clamps, one on said third leg and the other on one of said first and second legs, both at a same predetermined distance closer still to said tripod head mount.

8. The apparatus of claim 1, including a cushion matte atop said tray upon which said personal computer, laptop or video monitor rests.

9. Body motion analyzing apparatus comprising:
    a tripod having a head mount;
    a first clamp fixed in position on a first tripod leg at a predetermined distance below said head mount;
    a second clamp fixed in position on a second tripod leg at substantially the same predetermined distance below said head mount;
    a third clamp adjustably positionable on a third tripod leg at a lesser predetermined distance below said head mount;
    a rigid, flat, one piece rectangular tray having a triangular cutout with first and second apices fitted to respectively surround each of said first and second tripod legs and with a third apice fitted to surround said third tripod leg;
    one of a video camera, camcorder and digital camera secured to said tripod head mount;
    one of a personal computer, laptop and video monitor resting atop said tray;
    and wherein said tray is mounted to rest upon said first and second clamps as rear supports to extend forward below said third clamp;
    whereby any tendency for the weight of the computer, laptop or video monitor to upwardly lift a front end of the tray is resisted by the locking of said third clamp in position.

* * * * *